United States Patent
Murayama et al.

[11] Patent Number: 5,757,552
[45] Date of Patent: May 26, 1998

[54] MICROSCOPE OBJECTIVE LENS AND A MICROSCOPE INCORPORATING SAME

[75] Inventors: Norio Murayama, Mitaka; Yoshiyuki Shimizu, Miura, both of Japan

[73] Assignee: Nikon Corporation, Japan

[21] Appl. No.: 611,305

[22] Filed: Mar. 5, 1996

[30] Foreign Application Priority Data

Mar. 7, 1995 [JP] Japan ................................ 7-077319

[51] Int. Cl.[6] .............................. G02B 21/02; G02B 21/00
[52] U.S. Cl. ............................ 359/658; 359/368; 359/656
[58] Field of Search .................................. 359/363, 368, 359/385–389, 656–661, 791–795

[56] References Cited

U.S. PATENT DOCUMENTS

| | | | |
|---|---|---|---|
| 4,403,835 | 9/1983 | Ushida | 359/661 |
| 4,588,264 | 5/1986 | Shimizu | 359/659 |
| 4,666,256 | 5/1987 | Shimizu et al. | 359/659 |
| 5,076,676 | 12/1991 | Saito | 359/656 |
| 5,532,878 | 7/1996 | Suenaga et al. | 359/660 |

FOREIGN PATENT DOCUMENTS

| | | | |
|---|---|---|---|
| 147007 | 3/1981 | Germany | 359/656 |
| 40541 | 4/1978 | Japan | 359/385 |
| 59-100409 | 6/1984 | Japan . | |
| 60-205521 | 10/1985 | Japan . | |
| 769477 | 10/1980 | Russian Federation | 359/658 |

*Primary Examiner*—Thong Nguyen
*Attorney, Agent, or Firm*—Klarquist Sparkman Campbell Leigh & Whinston, LLP

[57] ABSTRACT

A microscope objective, and microscope incorporating same, are disclosed. A representative embodiment of the objective comprises, arranged on an optical axis, a front lens group having positive refractive power disposed on the object side, a rear lens group having negative refractive power disposed on the image side, and a corrective lens group interposed between the front and rear lens groups. The corrective lens group is axially movable and comprises a pair of meniscus lens elements each of which having a convex surface oriented toward each other. The corrective lens group serves to correct aberrations arising from a cover glass or other refractive body situated between the specimen being observed and the objective lens. To such end, the objective preferably satisfies the conditions:

$$|1/f_c| \leq |1/f| \times 0.02$$

$$0.95 \leq |m| \leq 1.05$$

wherein $f$ is the overall refractive power of the microscope objective lens, and $f_c$ and $m$ are the refractive power and magnification, respectively, of the corrective lens group.

4 Claims, 11 Drawing Sheets

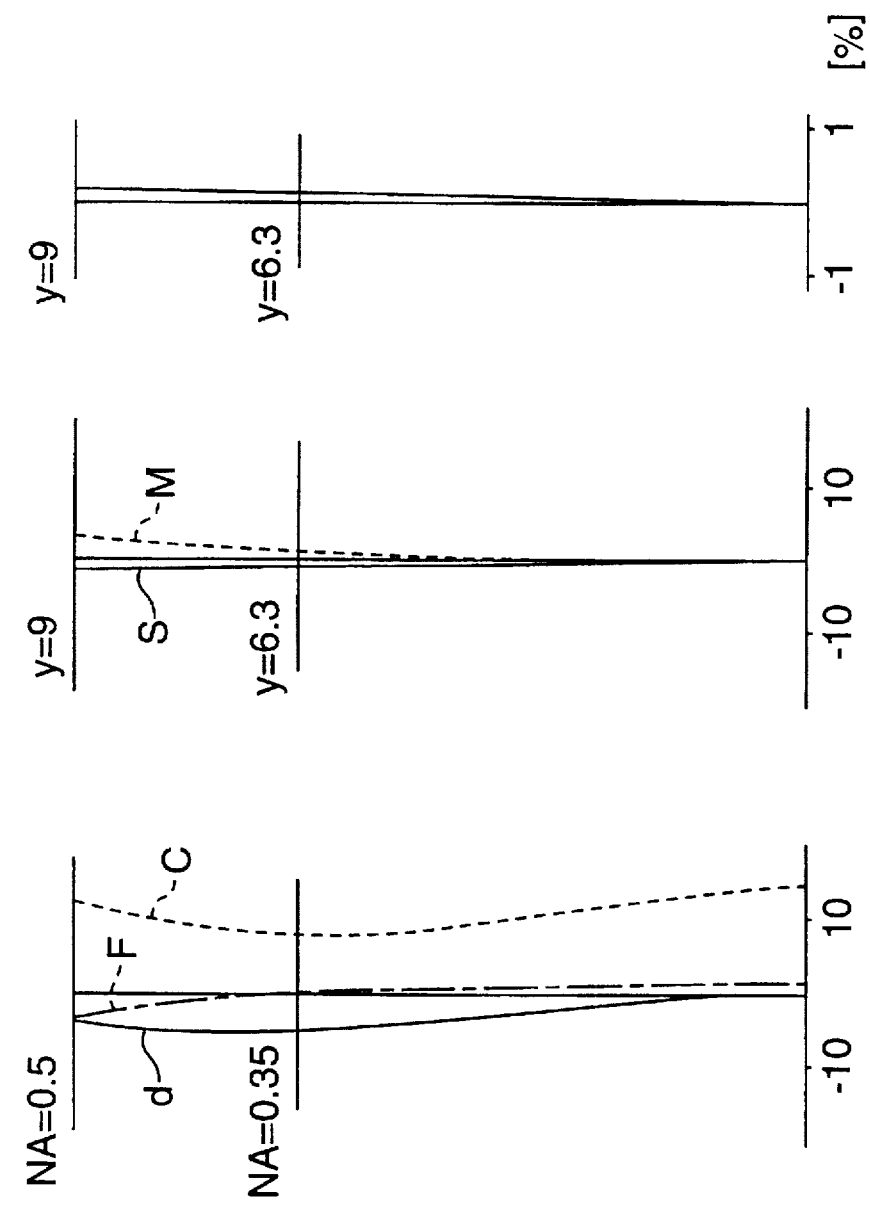

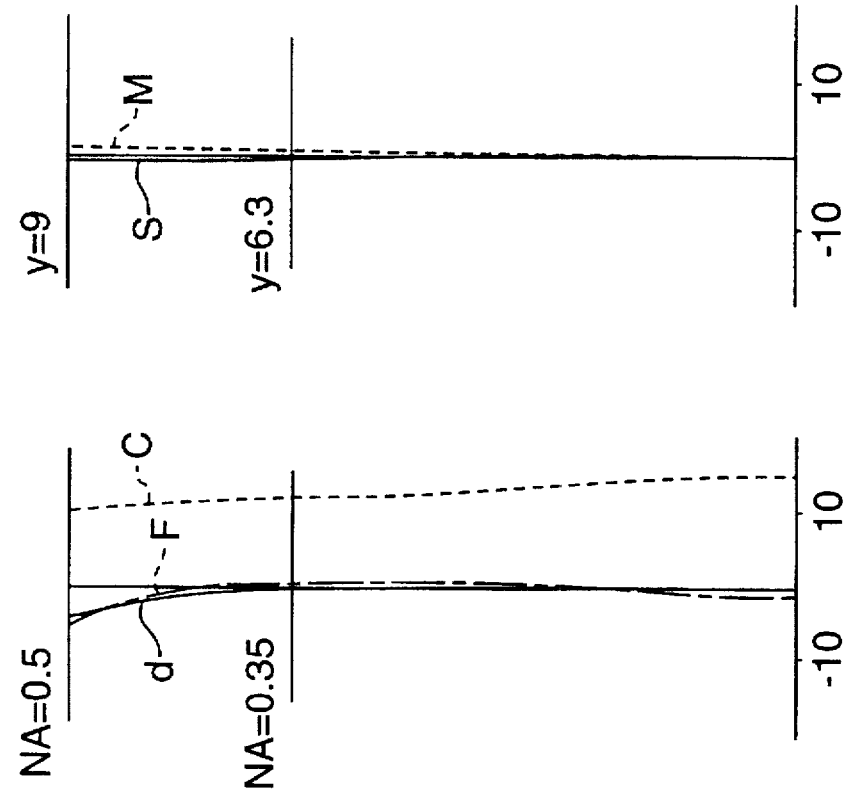
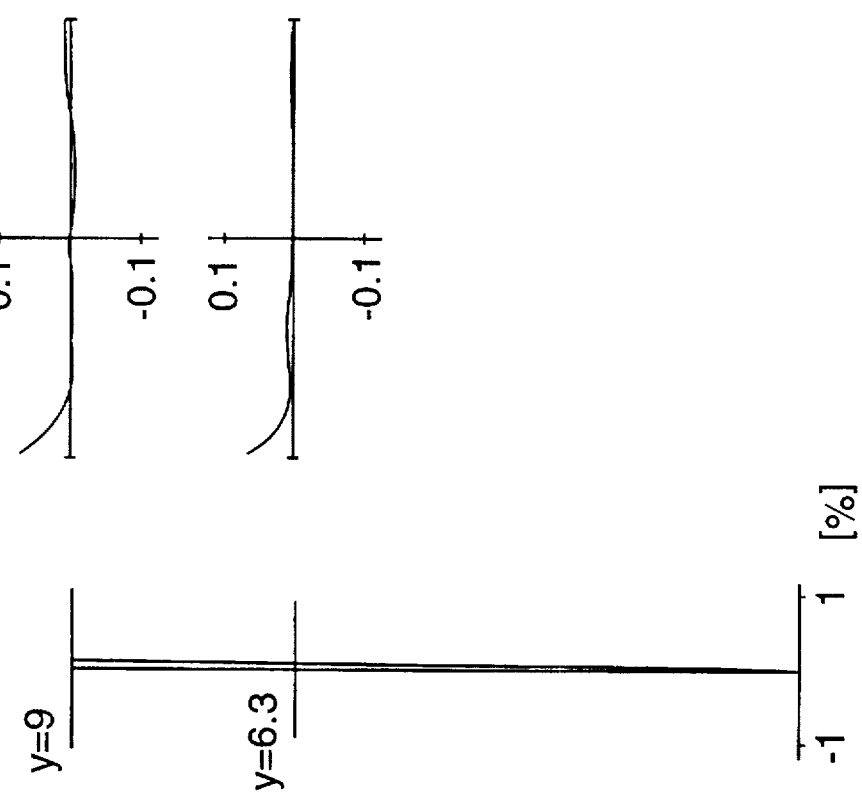
FIG. 3(a)  FIG. 3(b)  FIG. 3(c)  FIG. 3(d)

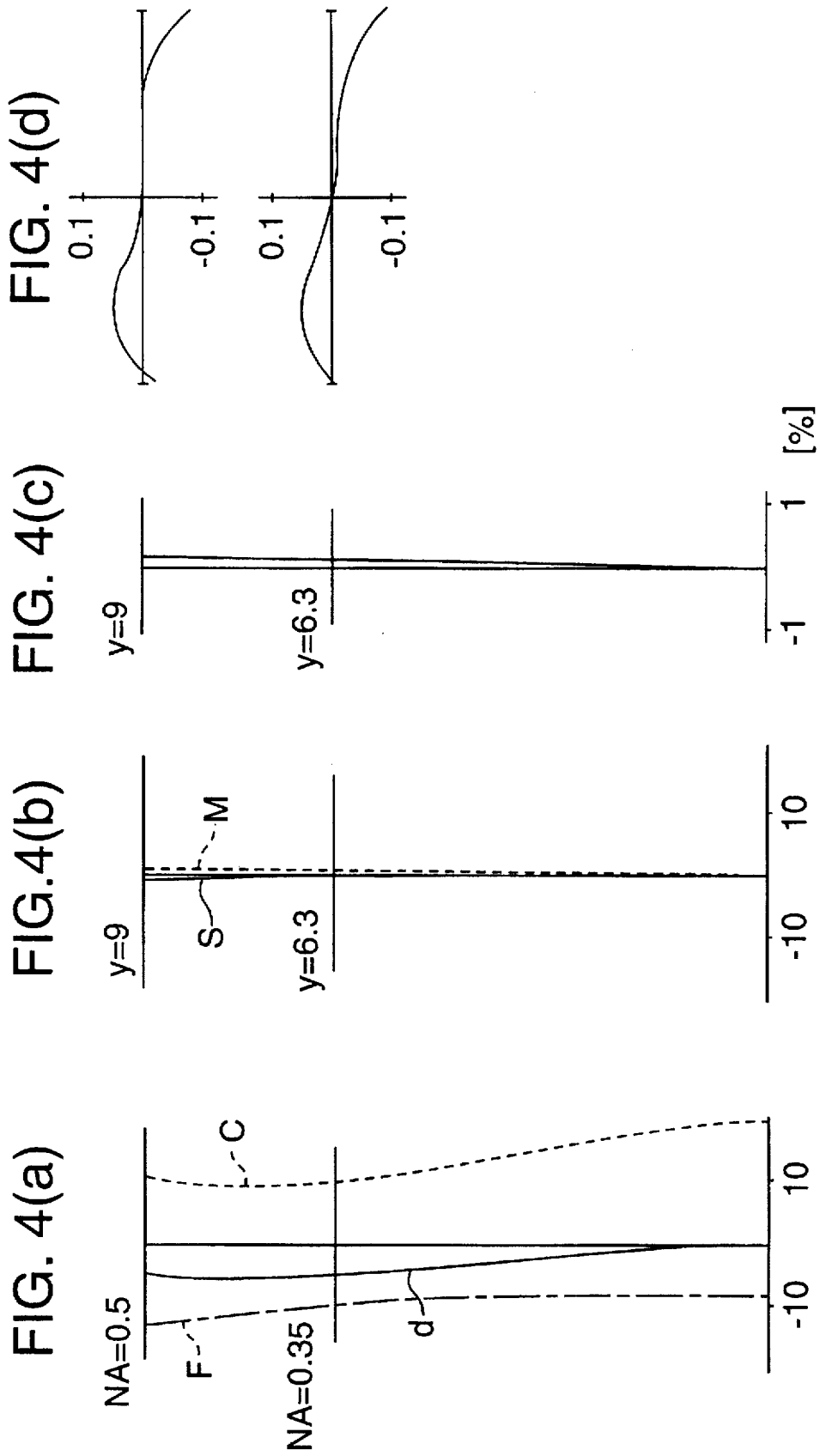

MICROSCOPE OBJECTIVE LENS AND A MICROSCOPE INCORPORATING SAME

FIELD OF THE INVENTION

This invention pertains to a microscope objective lens and a microscope incorporating the objective lens. Specifically, this invention pertains to a microscope objective lens that can produce an excellent quality image of a specimen under a cover glass or other refractive body, despite any thickness variations in the refractive body.

BACKGROUND OF THE INVENTION

An objective lens on a microscope, especially a microscope used for biology or medicine, must frequently observe a specimen situated beneath a cover glass or other refractive body such as water, translucent gel or plastic, or the like. Thus, light from the specimen must pass through the thickness of the, for example, cover glass (an optical distance equal to the product of the thickness of the cover glass times the refractive index of the cover glass) and through an air layer between the cover glass and the objective. The cover glass produces a positive spherical aberration, and it is preferable that the objective lens be able to correct this aberration.

Due to manufacturing errors and/or tolerances, a cover glass can have substantial variations in thickness, although typically these variations are relatively small. Aberrations that accompany such variations in cover glass thickness are commonly corrected by moving, along an optical axis, certain lens elements or lens groups in the objective lens.

With medical and biological microscopes, substantial aberrations can also arise whenever the microscope is used to observe a specimen that is suspended in an aqueous medium in a dish such as a petri dish or cell culture dish, wherein light from the specimen must also pass through the dish before entering the objective. In such instances, the depth of the aqueous medium and thickness of the dish can vary markedly.

Japan Kôkai patent document nos. SHO 59-100409 and SHO 60-205521, (the priority documents for U.S. Pat. Nos. 4,588,264 and 4,666,256, respectively) disclose microscope objective lenses that are able to correct changes in aberrations in situations when a cover glass, a dish and water, or other variable-thickness refractive body is interposed between the specimen and the objective lens. The microscope objective lenses disclosed in these documents employ a "corrective" lens group in which a negative meniscus lens element is laminated on each side of a biconvex lens element. Such a corrective lens group, which is normally movable along the optical axis of the objective lens, is conventionally situated between a front lens group and a rear lens group in the objective lens.

Unfortunately, whereas such objective lenses provide some correction of aberrations, further improvement is desirable in view of the increasing demands placed on the performance of research microscopes. Specifically, conventional microscope objective lenses as described above can satisfactorily correct spherical and chromatic aberrations as well as image-plane distortions to a certain extent. But, coma is frequently inadequately corrected for optimum image quality under some conditions of use. In addition, conventional objectives exhibit residual movement of the image point during attempts to effect such corrections. Furthermore, the overall focal length of a conventional microscope objective lens is narrow, and the amount of variation in cover-glass thickness that can be corrected by such an objective lens is relatively small and thus inadequate for certain applications.

SUMMARY OF THE INVENTION

An object of the present invention is to provide a microscope objective lens that can sufficiently correct various aberrations and eliminate movement of the image point so as to consistently provide excellent image formation, even when the thickness of an interposed refractive body such as a cover glass, dish, or the like varies over a broad range.

Another object is to provide a microscope incorporating such an objective lens.

The foregoing objects are satisfied by a microscope objective lens, and microscope incorporating such an objective, according to the present invention.

A preferred embodiment of the objective lens comprises, in order from the object side to the image side on an optical axis, a front lens group, a rear lens group, and a corrective lens group disposed between the front and rear lens groups. The front lens group has a positive refractive power that converges light from the object. The rear lens group has a negative refractive power.

The corrective lens group is axially moveable in the air space located between the front and rear lens groups, and comprises a pair of meniscus lens elements. Each of the meniscus lens elements, which can be cemented or not cemented, has a convex surface. The meniscus lens elements are disposed on the optical axis such that the convex surfaces are oriented toward each other.

A microscope objective lens according to the present invention preferably satisfies the following conditions:

$$|1/f_c| \leq |1/f| \times 0.02$$

$$0.95 \leq |m| \leq 1.05$$

wherein f is the overall refractive power of the microscope objective lens, and $f_c$ and m are the refractive power and magnification, respectively, of the corrective lens group.

BRIEF DESCRIPTION OF THE DRAWINGS

FIG. 2 includes various aberration diagrams for Example Embodiment 1 when used with a cover glass having "zero" thickness. Specifically, FIG. 2a shows spherical aberration, FIG. 2b shows astigmatism, FIG. 2c shows distortion, and FIG. 2d shows meriodonal coma;

FIG. 3 includes various aberration diagrams for Example Embodiment 1 when used with a cover glass having a thickness of 5 mm. Specifically, FIG. 3a shows spherical aberration, FIG. 3b shows astigmatism, FIG. 3c shows distortion, and FIG. 3d shows meriodonal coma;

FIG. 4 includes various aberration diagrams for Example Embodiment 1 when used with a cover glass having a thickness of 10 mm. Specifically, FIG. 4a shows spherical aberration, FIG. 4b shows astigmatism, FIG. 4c shows distortion, and FIG. 4d shows meriodonal coma;

thickness. Specifically, FIG. 6a shows spherical aberration, FIG. 6b shows astigmatism, FIG. 6c shows distortion, and FIG. 6d shows meriodonal coma;

FIG. 7a shows spherical aberration, FIG. 7b shows astigmatism, FIG. 7c shows distortion, and FIG. 7d shows meriodonal coma;

FIG. 8a shows spherical aberration, FIG. 8b shows astigmatism, FIG. 8c shows distortion, and FIG. 8d shows meriodonal coma;

FIG. 9a shows spherical aberration, FIG. 9b shows astigmatism, FIG. 9c shows distortion, and FIG. 9d shows meriodonal coma;

FIG. 10a shows spherical aberration, FIG. 10b shows astigmatism, FIG. 10c shows distortion, and FIG. 10d shows meriodonal coma.

DETAILED DESCRIPTION

A "positive" distance or direction along an optical axis extends from left ("object side") to right ("image side") in an optical diagram; a "negative" distance or direction extends from right to left.

The "curvature radius" of an optical surface (such as a surface of a lens element) is "positive" whenever the center of curvature lies to the right of the surface, and "negative" whenever the center of curvature lies to the left of the surface.

An "interfacial distance" is the distance, along an optical axis, between adjacent optical surfaces on separate optical elements.

In the following description, it will be understood that a "cover glass" can be any of various refractive bodies as listed above that can be placed over a specimen for protection from physical trauma, drying, or other purpose. Other refractive bodies can also behave as a cover glass, such a clear plastic surface supporting living cells being observed using a microscope objective.

Figure 1:
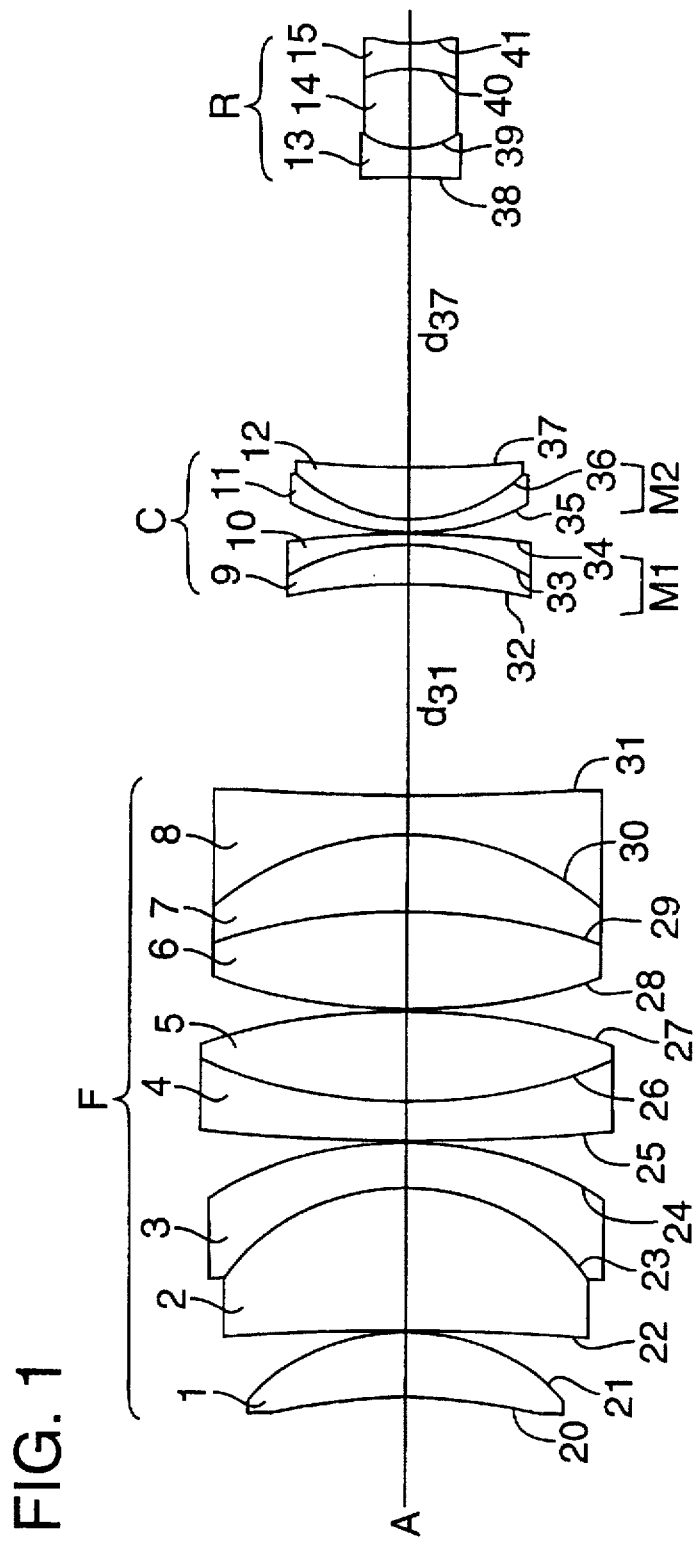
FIG. 1 is an optical diagram showing general aspects of a preferred embodiment of a microscope objective lens according to the present invention, as well as specific aspects of Example Embodiment 1.

General aspects of a preferred embodiment of a microscope objective lens according to the present invention are shown in FIG. 1. The objective lens comprises, in order from the object side to the image side on an optical axis A, a front lens group F having a positive refractive power, a rear lens group R having a negative refractive power, and a corrective lens group C interposed between the front and rear lens groups. The corrective lens group C is axially moveable in an air space located between the front and rear lens groups.

In the FIG. 1 embodiment, the corrective lens group C comprises a pair of meniscus lenses M1, M2. Each of the meniscus lenses M1, M2, which generally can be either a singlet or a cemented lens, has a convex surface 34, 35, respectively. The meniscus lenses M1, M2 are disposed on the optical axis such that the convex surfaces 34, 35 are oriented toward each other.

A microscope objective lens according to the present invention preferably satisfies the following conditions:

$$|1/f_c| \le |1/f| \times 0.02$$

$$0.95 \le |m| \le 1.05$$

wherein f is the overall refractive power of the objective lens, and $f_c$ and m are the refractive power and magnification, respectively, of the corrective lens group C.

The front lens group F produces a large negative spherical aberration; this negative spherical aberration is corrected a required amount by the corrective lens group C. The rear lens group R also provides spherical aberration correction, to yield an overall excellent correction of spherical aberration by the entire objective lens.

The corrective lens group C is situated in convergent light from the front lens group F. If the corrective lens group C is moved frontwardly, the height (from the axis A) of incident light entering the corrective lens group C becomes taller; thus, the corrective lens group C produces a large positive spherical aberration. Conversely, if the corrective lens group C is moved rearwardly, the height of incident light entering the corrective lens group C becomes shorter; thus, the corrective lens group C produces a small positive spherical aberration. Consequently, it is possible to correct spherical aberrations, such as spherical aberrations arising from a cover glass having a varying thickness interposed between the objective lens and an object being imaged by the objective lens, by axially moving the corrective lens group C.

The refractive power $1/f_c$ of the corrective lens group C is preferably about 2% or less of the overall refractive power $1/f$ of the objective lens. Thus, the corrective lens group C preferably has relatively no refractive power. Moving such a corrective lens group C along the optical axis A advantageously will effect virtually no movement of the image point, even during a change in spherical aberration.

In conventional telecentric optical systems, not limited to microscope objective lenses, used to visualize various points on an object, the effect of variations in the thickness of a cover glass or the like, disposed between the object and the optical system, on a light path is the same whether the object point is situated on- or off-axis. In other words, the optical effect of the cover glass is uniform across the entire image plane. Consequently, in a telecentric lens system, variations in the thickness of the cover glass will not directly cause coma aberration; but, coma aberration will appear to change due to the effects of changes in spherical aberration.

In addition, the thickness of a cover glass will not have any effect on the paths of principal rays in a telecentric optical system. In an objective according to the present invention, because there is virtually no movement of the image point accompanying any axial movement of the correction lens group C, there is no movement of the image point. This is because the several optical light path lengths between the object and the objective lens are always constant.

Further with respect to an objective lens according to the present invention, the front lens group F produces negative spherical aberration; but, preferably, other aberrations are preferably well corrected by this group. It is especially desirable to correct any inner and outer coma that exist at the sine condition. The corrective lens group C should also possess similar characteristics. Namely, while the corrective lens group C produces positive spherical aberration in order to correct the negative spherical aberration produced by the front lens group, other aberrations imparted by the corrective lens group C are preferably minimal; it is especially desirable that the corrective lens group suppress the production of inner and outer coma. In other words, it is desirable for the light flux that has passed through the cover glass, the front lens group F and the corrective lens group C to be always in the same aberration-corrected state, regardless of the thickness of the cover glass. Besides correcting spherical aberration, the corrective lens group C should not, as much as possible, produce any of its own aberrations.

For example, assuming a certain thickness of the cover glass and a certain axial position of the corrective lens group C, it is possible, by using the corrective lens group C to correct any inner coma produced by the front lens group C, to have excellent aberrational correction overall. However, if the thickness of the cover glass were to change, and if the corrective lens group C were to be moved appropriately to correct any new spherical aberration arising from the change, it is not certain that coma would remain in the same excellent state as before movement. Consequently, the corrective lens group C should suppress as much as possible the production of aberrations other than spherical aberration.

While the corrective lens group C should not produce aberrations other than spherical aberration, there is no specific restriction on the refractive power required to achieve that purpose. However, the refractive power of the corrective lens group C should be small enough so as to sufficiently minimize movement of the image point. Of course, if the corrective lens group were made of parallel planar elements rather than refractive elements, there would be no movement of the image point upon movement of the corrective lens group C. This would be due to the zero refractive power and unitary "magnification" (of an object at infinity) of planar elements. (These conditions also apply for an image magnification of 1 for an object at any object distance from the objective.) If the corrective lens group C behaved the same as parallel planar elements with respect to paraxial rays, it would be necessary for the corrective lens group C to fulfill the same conditions as parallel planar elements; i.e., it would be necessary for the refractive power of the corrective lens group C to be sufficiently small, while simultaneously having a magnification of about 1.

To perform the aberration-correction functions described above while simultaneously restricting movement of the image point, the corrective lens group C preferably comprises a pair of meniscus lenses arranged with their convex faces facing each other. Also, each meniscus lens is preferably a cemented lens so as to provide excellent correction of chromatic and spherical aberrations. Alternatively, one of the meniscus lenses can be a single lens element and the other can be a cemented lens.

In order to satisfactorily limit movement of the image point, the absolute value of the refractive power of the corrective lens group C is preferably 2% or less of the overall refractive power of the objective lens, and the magnification of the corrective lens group C is preferably within 5% of unity, i.e., in the range from 0.95 to 1.05. This is because movement of the image point becomes great if these ranges are exceeded, which increases the number of practical problems.

The magnification of the corrective lens group C when its refractive power is zero is defined as, for an object placed at infinity: (height of light rays exiting the corrective lens group)/(height of incident light rays entering the corrective lens group). The magnification of the corrective lens group C when its refractive power is not zero is defined as: (distance from the lens surface in the corrective lens group closest to the image surface to the focal point)/(focal length).

EXAMPLE EMBODIMENT 1

FIG. 1 shows specific features of Example Embodiment 1 of a microscope objective lens, comprising (in order from the object side): a front lens group F with a positive refractive power that converges the light emitted from the object, a rear lens group R with a negative refractive power, and a corrective lens group C axially interposed in the air space between the front lens group F and rear lens group R. The corrective lens group C is movable along the optical axis A.

The corrective lens group C comprises a pair of cemented meniscus lenses M1 and M2, both of which being arranged on the optical axis with their respective convex faces 34, 35 oriented toward each other. Example Embodiment 1 is telecentric on the object side, with a service magnification of 40× and an NA (numerical aperture) of 0.5.

Table 1, below, lists numeric specifications for Example Embodiment 1. The front lens group F comprises lens elements 1 through 8, the corrective lens group C comprises lens elements 9 through 12, and the rear lens group comprises lens elements 13 through 15. The interfacial distance $d_{31}$ between the front lens group F and the corrective lens group C, and the interfacial distance $d_{37}$ between the corrective lens group C and the rear lens group R are variable, and $d_{31}+d_{37}=38.765$. Additionally, the corrective lens group C has a focal length $f_c$ wherein $f_c=\infty$. In other words, the refractive power ($1/f_c$) of the corrective lens group C is 0 (zero) and the magnification m of the corrective lens group C of an infinitely distant object is m=+1.000.

TABLE 1

| Lens Surface No. | Curvature Radius R (mm) | Interfacial Distance d (mm) | Lens No. | Refractive Index n | Abbe No. $v_d$ |
|---|---|---|---|---|---|
| 20 | −55.609 | 5.2 | 1 | 1.56384 | 60.7 |
| 21 | −17.962 | 0.1 | | | |
| 22 | −230.064 | 11.0 | 2 | 1.49782 | 82.5 |
| 23 | −19.417 | 3.5 | 3 | 1.7552 | 27.6 |
| 24 | −31.159 | 0.1 | | | |
| 25 | 149.872 | 3.0 | 4 | 1.50137 | 56.4 |
| 26 | 41.820 | 7.0 | 5 | 1.59319 | 67.9 |
| 27 | −58.179 | 0.2 | | | |
| 28 | 49.678 | 7.5 | 6 | 1.49782 | 82.5 |
| 29 | −48.629 | 6.0 | 7 | 1.78472 | 25.8 |
| 30 | −24.401 | 3.0 | 8 | 1.75692 | 31.6 |
| 31 | 212.618 | $d_{31}$ | | | |
| 32 | −53.483 | 3.0 | 9 | 1.59507 | 35.5 |
| 33 | −22.606 | 0.8 | 10 | 1.80411 | 46.5 |
| 34 | −90.254 | 0.2 | | | |
| 35 | 20.722 | 1.0 | 11 | 1.74950 | 35.2 |
| 36 | 13.206 | 4.0 | 12 | 1.49782 | 82.5 |
| 37 | 75.909 | $d_{37}$ | | | |
| 38 | −82.648 | 2.2 | 13 | 1.61266 | 44.4 |
| 39 | 6.648 | 6.0 | 14 | 1.74077 | 27.6 |
| 40 | −14.121 | 2.0 | 15 | 1.74950 | 35.2 |
| 41 | 8.817 | | | | |

Table 2 shows $d_{31}$, $d_{37}$, and the image distance (distance from the most imagewise lens surface 41 to an image plane) for cover-glass thicknesses of 0, 5, and 10. FIGS. 2a–2d, 3a–3d, and 4a–4d show the corresponding aberration graphs. The refractive index $n_{CG}$ of the cover glass in this example is $n_{CG}=1.52216$, and the Abbe number $v_d$ is $v_d=58.8$. From Table 2, it can be seen that the image distance is held constant by appropriately moving the corrective lens group C, even when there is a substantial change in the cover glass thickness. As is shown in the various aberration graphs, it can be seen that the microscope objective lens of this embodiment has superior imaging properties and performance.

TABLE 2

| Cover Glass Thickness | $d_{31}$ (mm) | $d_{37}$ (mm) | Image Distance |
|---|---|---|---|
| 0 | 16.312 | 22.453 | 200 mm |
| 5 | 21.712 | 17.053 | 200 mm |
| 10 | 30.312 | 8.453 | 200 mm |

EXAMPLE EMBODIMENT 2

Figure 5:
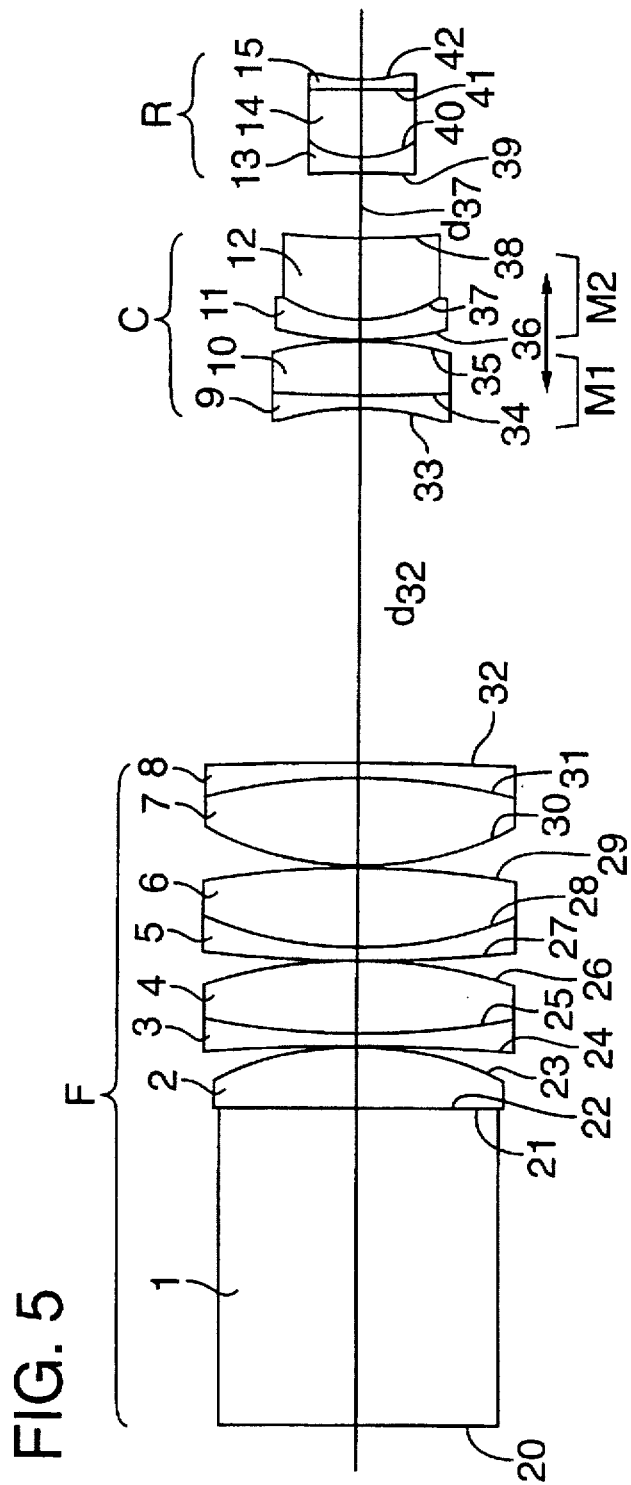
FIG. 5 is an optical diagram showing specific aspects of Embodiment 2.
Figure 6:
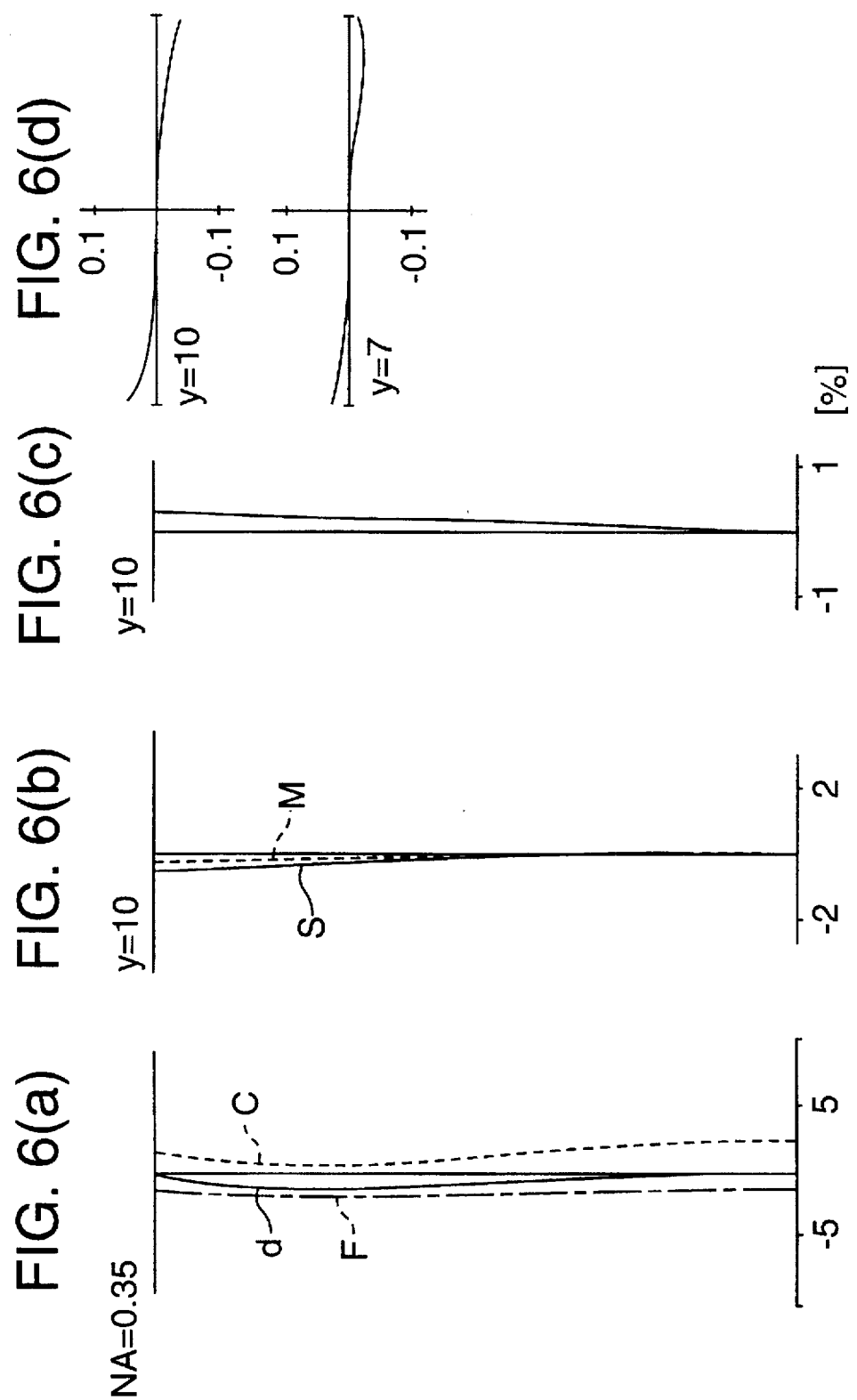
FIG. 6 includes various aberration diagrams for Example Embodiment 2 when used with a cover glass having "zero"
Figure 7:
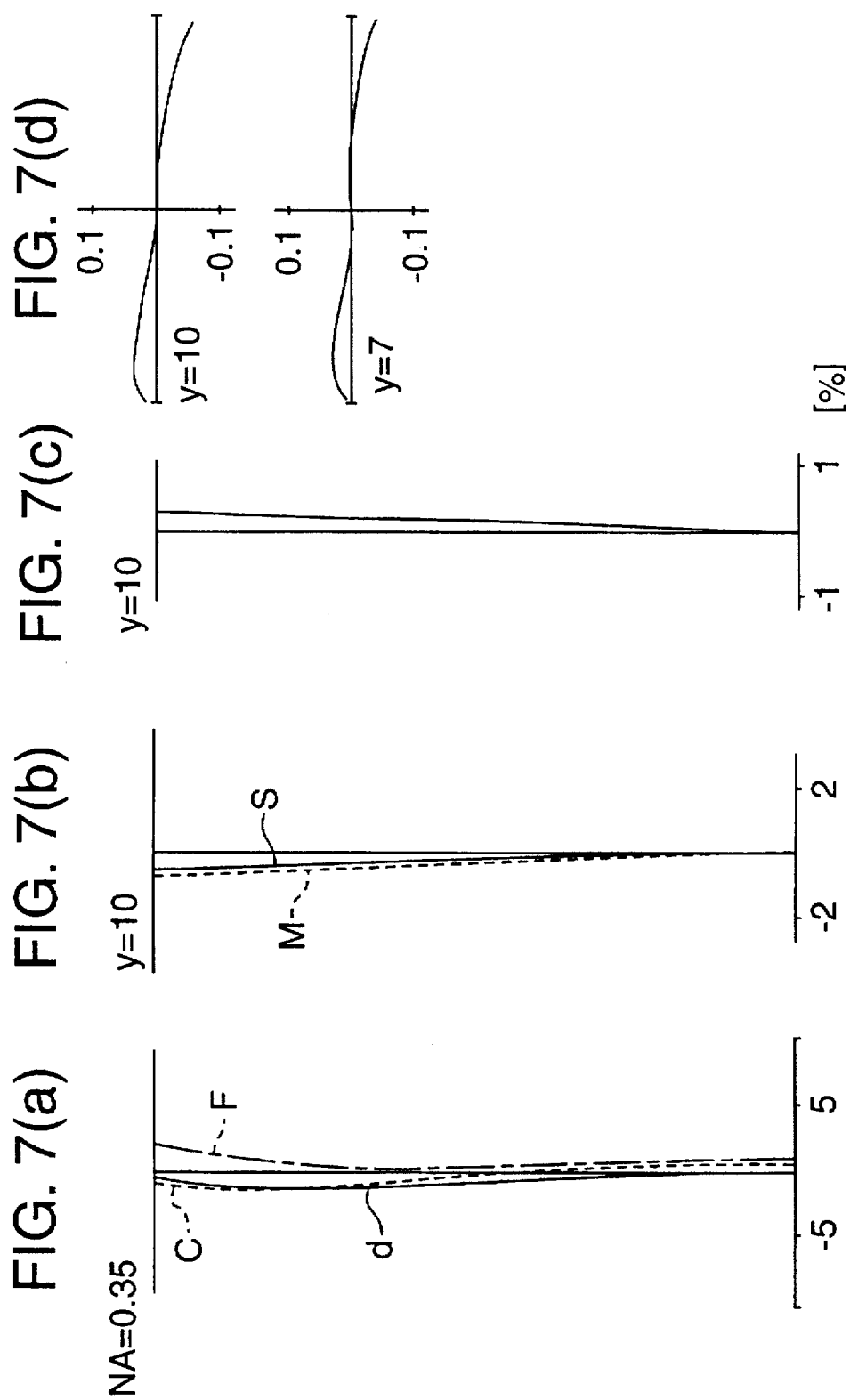
FIG. 7 includes various aberration diagrams for Example Embodiment 2 when used with a cover glass having a thickness of 9.4 mm. Specifically.
Figure 8:
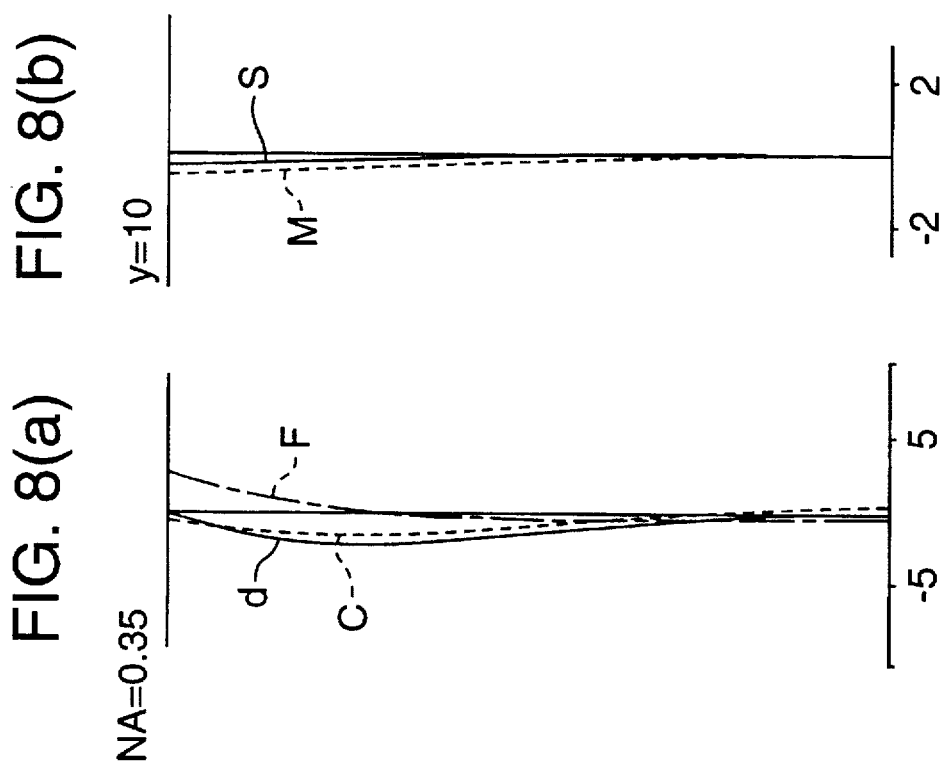
FIG. 8 includes various aberration diagrams for Example Embodiment 2 when used with a cover glass having a thickness of 15 mm. Specifically.
Figure 9:
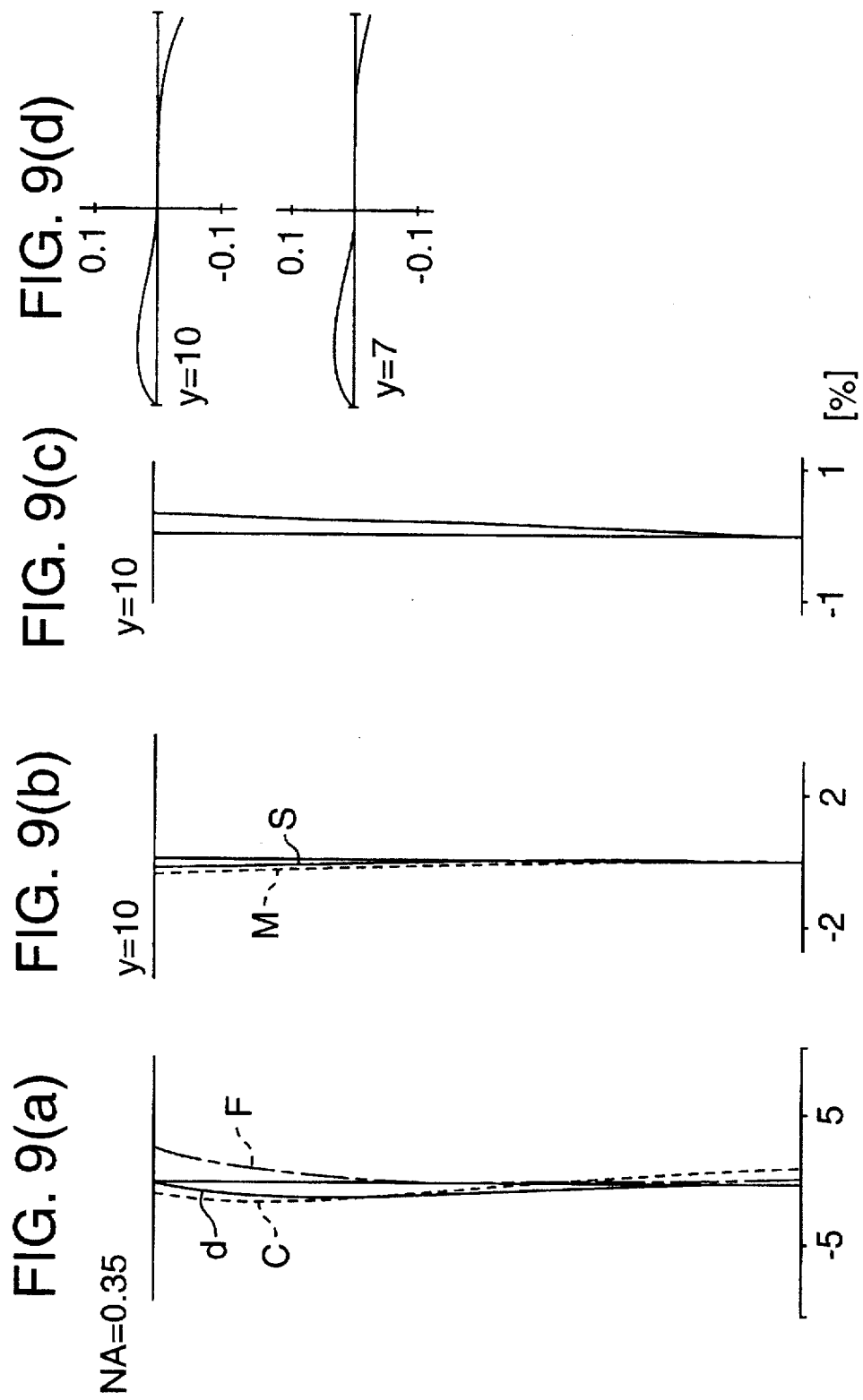
FIG. 9 includes various aberration diagrams for Example Embodiment 2 when used with a layer of water having a "thickness" of 10.6 mm. Specifically.
Figure 10:
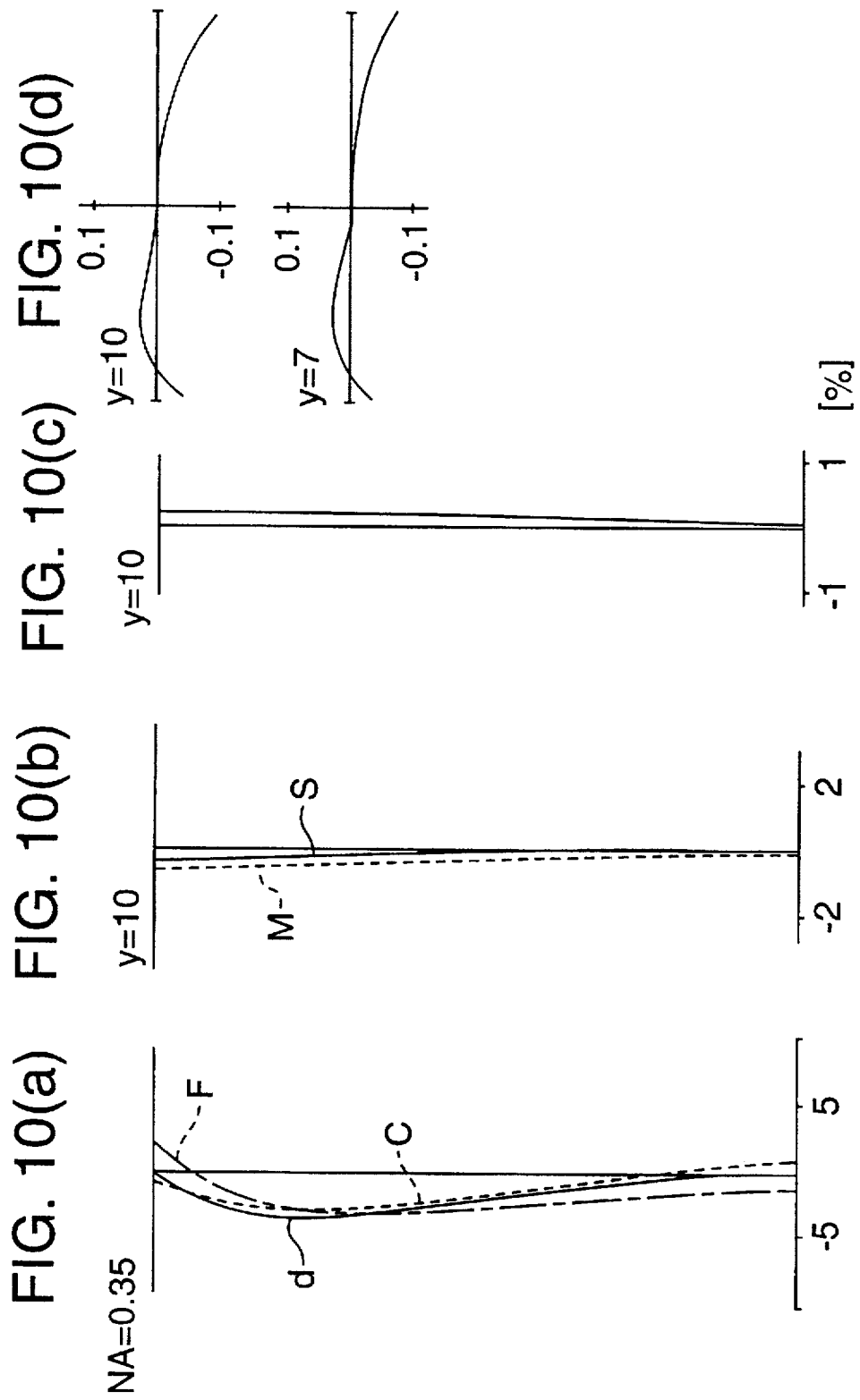
FIG. 10 includes various aberration diagrams for Example Embodiment 2 when used with a layer of water having a "thickness" of 16.8 mm. Specifically.

An objective lens configuration according to Example Embodiment 2 is shown in FIG. 5, and the numeric specifications for this embodiment are shown in Table 3. Lens elements 1 through 8 comprise the front lens group F, lens elements 9 through 12 comprise the corrective lens group C, and lens elements 13 through 15 comprise the rear lens group R. In addition, the interfacial distance $d_{32}$ between the front lens group F and the corrective lens group C, and the interfacial distance $d_{38}$ between the corrective lens group C and the rear lens group R are variable; furthermore, $d_{32} + d_{38} = 31.5$. The focal length $f_c$ of the corrective lens group C is $f_c = \infty$. In other words, the refractive power ($1/f_c$) of the corrective lens group C is 0 (zero) and the magnification m of the corrective lens group C (of an infinitely distant object) is $m = +1.000$.

The microscope objective lens in this Example Embodiment is telecentric on the object side, with a service magnification of 20 times and a numerical aperture (NA) of 0.35.

TABLE 3

| Lens Face No. | Curvature Radius R (mm) | Interfacial Distance d (mm) | Lens No. | Refractive Index n | Abbe No. $v_d$ |
|---|---|---|---|---|---|
| 20 | ∞ | 23.2 | 1 | 1.74443 | 49.5 |
| 21 | ∞ | 0.2 | | | |
| 22 | ∞ | 4.45 | 2 | 1.62374 | 47.1 |
| 23 | −25.082 | 0.1 | | | |
| 24 | −163.174 | 1.0 | 3 | 1.7495 | 35.2 |
| 25 | 67.614 | 5.4 | 4 | 1.49782 | 82.2 |
| 26 | −41.038 | 0.1 | | | |
| 27 | 163.174 | 1.0 | 5 | 1.61266 | 44.4 |
| 28 | 33.780 | 6.0 | 6 | 1.43388 | 95.6 |
| 29 | −64.906 | 0.1 | | | |
| 30 | 25.749 | 6.5 | 7 | 1.43388 | 95.6 |
| 31 | −48.063 | 1.0 | 8 | 1.713 | 53.9 |
| 32 | −355.356 | $d_{32}$ | | | |
| 33 | −25.501 | 1.0 | 9 | 1.56384 | 60.7 |
| 34 | 107.295 | 4.0 | 10 | 1.56883 | 56.1 |
| 35 | −26.400 | 0.1 | | | |
| 36 | 33.062 | 1.5 | 11 | 1.80454 | 39.6 |
| 37 | 13.865 | 6.0 | 12 | 1.6172 | 54.0 |
| 38 | 47.891 | $d_{38}$ | | | |
| 39 | −112.492 | 1.0 | 13 | 1.61266 | 44.4 |
| 40 | 9.332 | 5.0 | 14 | 1.71736 | 29.5 |
| 41 | −151.285 | 0.7 | 15 | 1.713 | 53.9 |
| 42 | 14.744 | | | | |

Table 4, below, shows $d_{32}$, $d_{38}$, and the image distance (distance from the most imagewise lens surface 42 to an image plane) for cover-glass thicknesses of 0, 9.4 and 15.0. FIGS. 6a–6d, 7a–7d, and 8a–8d show the corresponding aberration graphs. The refractive index $n_{CG}$ of the cover glass in this example is $n_{CG} = 1.51454$, and the Abbe number $v_d$ is $v_d = 54.6$. From Table 4, it can be seen that the image distance is held constant by appropriately moving the corrective lens group C, even when there is a substantial change in the cover glass thickness.

TABLE 4

| Cover Glass Thickness | $d_{31}$ (mm) | $d_{37}$ (mm) | Image Distance |
|---|---|---|---|
| 0 | 8.2 | 23.3 | 198.5 mm |
| 9.4 | 16.5 | 15.0 | 198.5 mm |
| 15.0 | 26.8 | 4.7 | 198.5 mm |

Table 5, below, shows $d_{32}$, $d_{38}$, and the image distance in instances where water is used instead of a cover glass and the water thickness is either 10.6 or 16.8. FIGS. 9a–9d, and 10a–10d show corresponding aberration graphs. The refractive index $n_W$ of the water is $n_W = 1.331$ and the Abbe number $v_d$ is $v_d = 54.1$. As is shown in Table 5, it can be seen that the image distance is held constant by appropriately moving the corrective lens group C, even when there is a substantial change in the thickness of a water layer over the object.

TABLE 5

| Water Thickness | $d_{32}$ (mm) | $d_{38}$ (mm) | Image Distance |
|---|---|---|---|
| 10.6 | 16.5 | 15.0 | 198.5 mm |
| 16.8 | 26.8 | 4.7 | 198.5 mm |

As is shown in the various aberration graphs (FIGS. 6a–6d, 7a–7d, 8a–8d, 9a–9d, and 10a–10d), it can be seen that the microscope objective lens of this embodiment has superior imaging properties and performance.

Figure 11:
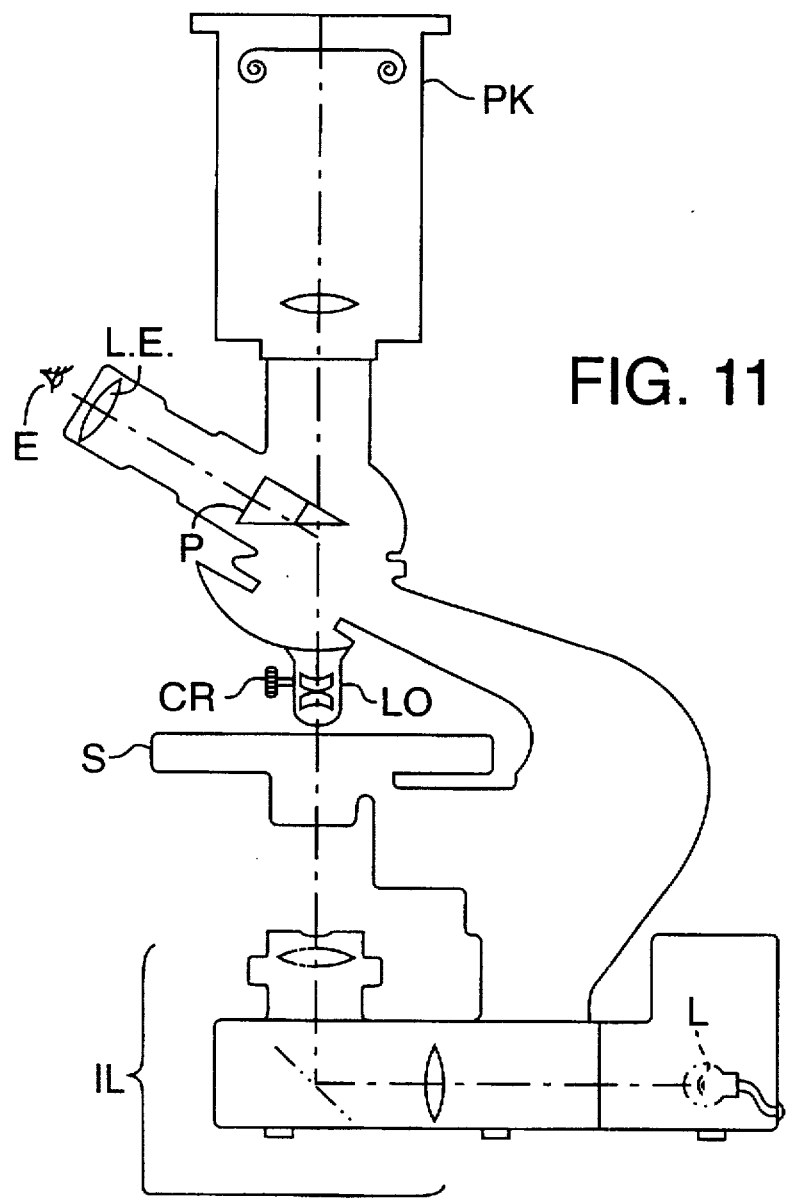
FIG. 11 is an optical diagram of a representative embodiment of a microscope including an objective lens according to the present invention.

FIG. 11 shows, in combination, a microscope and an objective lens LO according to the present invention. Referring to FIG. 11, light flux exiting a light source L passes through an illumination optical system IL to provide Koehler illumination of the specimen (specimen not shown, but would normally be situated on the stage S beneath the microscope objective lens LO). The specimen is normally placed on a glass slide overlaid by a cover glass (not shown). The microscope objective lens LO, such as a lens according to either of Example Embodiments 1 and 2, and the eyepiece lens LE are used to observe the specimen, whereby the specimen is directly observed by the observer's eye E. The microscope in this embodiment is equipped with a light path-splitting prism P situated between the microscope objective lens LO and eyepiece lens LE, so that a light flux can be directed to a photographic camera PK if desired for photomicrography.

Further according to the present invention, any aberrations produced by the cover glass are corrected without moving the image point by axially moving the moveable lens group C shown in FIG. 1 and FIG. 5. This can be conveniently performed by turning a correction ring CR that is operably connected to the correction lens group G.

With this invention, as described above, aberrations can be sufficiently corrected without imparting any movement of the image point, even when the thickness of a cover glass, water layer, dish bottom, etc., existing between the specimen and the objective lens varies over a substantial range. Thus, a microscope objective lens, and a microscope incorporating such a lens, are provided that produce consistently excellent images of the specimen.

The described embodiments are to be considered in all respects only as illustrative and not restrictive. The scope of the invention, therefore, resides within the text and spirit of the appended claims rather than by the foregoing description. All changes that come within the meaning and range of equivalency of the claims are to be embraced within the scope of the claims.

What is claimed is:

1. A microscope objective lens, comprising in an order from a specimen side:
   (a) a front lens group having positive refractive power, the front lens group being operable to converge light from a specimen disposed objectwise of the front lens group;
   (b) a rear lens group having negative refractive power;
   (c) a corrective lens group that is axially moveable and is situated in an air space located between the front and rear lens groups, the corrective lens group having a refractive power $1/f_c$ and a magnification m, and comprising first and second meniscus lenses each having a convex surface oriented toward the other convex surface; and
   (d) wherein the objective lens has an overall refractive power $1/f$ and satisfies the conditions:

$$|1/f_c| \leq |1/f| \times 0.02$$

$$0.95 \leq |m| \leq 1.05.$$

2. The microscope objective lens of claim 1, wherein each of the first and second meniscus lenses is a cemented lens.

3. A microscope, comprising:
   (a) the microscope objective lens of claim 1; and
   (b) an eyepiece lens axially disposed relative to the objective lens and operable to provide a viewable image of a specimen placed objectwise of the objective lens.

4. The microscope of claim 3, further comprising
   (a) a light source; and
   (b) an illumination optical system for illuminating the specimen with light from the light source.

* * * * *